US012027131B2

(12) United States Patent
Wang

(10) Patent No.: US 12,027,131 B2
(45) Date of Patent: Jul. 2, 2024

(54) COMPENSATION METHOD FOR DISPLAY AND DISPLAY

(71) Applicant: TCL China Star Optoelectronics Technology Co., Ltd., Guangdong (CN)

(72) Inventor: Wenli Wang, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/622,309

(22) PCT Filed: Dec. 9, 2021

(86) PCT No.: PCT/CN2021/136735
§ 371 (c)(1),
(2) Date: Dec. 23, 2021

(87) PCT Pub. No.: WO2023/097735
PCT Pub. Date: Jun. 8, 2023

(65) Prior Publication Data
US 2024/0038187 A1 Feb. 1, 2024

(30) Foreign Application Priority Data
Nov. 30, 2021 (CN) ......................... 202111442423.5

(51) Int. Cl.
*G09G 3/36* (2006.01)

(52) U.S. Cl.
CPC ....... *G09G 3/36* (2013.01); *G09G 2320/0233* (2013.01)

(58) Field of Classification Search
CPC ............. G09G 3/36; G09G 2320/0233; G09G 2320/0285; G09G 3/006; G09G 2320/0271
See application file for complete search history.

(56) References Cited

U.S. PATENT DOCUMENTS

2015/0187289 A1 7/2015 Kim et al.
2015/0206276 A1* 7/2015 Jung .................... G06T 3/4007 345/561
2020/0013326 A1* 1/2020 Zheng ...................... G09G 3/20
2020/0320944 A1* 10/2020 Zhang ...................... G09G 5/10
2021/0150983 A1* 5/2021 Guo .................... G09G 3/3688

FOREIGN PATENT DOCUMENTS

CN 106910483 6/2017
CN 108510956 9/2018
CN 108877740 11/2018
CN 109036260 12/2018
(Continued)

*Primary Examiner* — Md Saiful A Siddiqui

(57) ABSTRACT

The present application relates to a compensation method for a display and a display, wherein the method includes: acquiring a display image of the display; determining to-be-compensated regions corresponding to the display image, wherein the to-be-compensated regions include at least one first to-be-compensated region and at least one second to-be-compensated region; the display image is compensated based on the to-be-compensated regions, and a compensation mode of the at least one to-be-compensated region is different from a compensation mode of the at least one second to-be-compensated region.

14 Claims, 3 Drawing Sheets

(56) References Cited

FOREIGN PATENT DOCUMENTS

| | | | | |
|---|---|---|---|---|
| CN | 109119035 | | | 1/2019 |
| CN | 109377935 | | | 2/2019 |
| CN | 109545163 | | | 3/2019 |
| CN | 109637499 | | | 4/2019 |
| CN | 109979402 | | | 7/2019 |
| CN | 110085186 | | | 8/2019 |
| CN | 110447061 | | | 11/2019 |
| CN | 111028809 | | | 4/2020 |
| CN | 111276086 | | | 6/2020 |
| CN | 111276086 | A | * | 6/2020 |
| CN | 111710277 | | | 9/2020 |
| CN | 111968563 | A | * | 11/2020 |
| CN | 112233633 | | | 1/2021 |
| CN | 113314063 | | | 8/2021 |
| CN | 113421510 | | | 9/2021 |
| CN | 113687806 | | | 11/2021 |
| JP | 2000-148094 | | | 5/2000 |

* cited by examiner

| | | |
|---|---|---|
| Block | H, V | general Block setting in horizontal and vertical directions |
| ... | ... | ... |
| Area1-Block | H1, V1 | region 1, Block setting in horizontal & vertical directions |
| Area1-H | Pos1H-Start, Pos1H-End | region 1, horizontal coordinate interval |
| Area1-V | Pos1V-Start, Pos1V-End | region 1, vertical coordinate interval |
| Area2-Block | H2, V2 | region 2, Block setting in horizontal & vertical directions |
| Area2-H | Pos2H-Start, Pos2H-End | region 2, horizontal coordinate interval |
| Area2-V | Pos2V-Start, Pos2V-End | region 2, vertical coordinate interval |
| Area3-Block | H3, V3 | region 3, Block setting in horizontal & vertical directions |
| Area3-H | Pos3H-Start, Pos3H-End | region 3, horizontal coordinate interval |
| Area3-V | Pos3V-Start, Pos3V-End | region 3, vertical coordinate interval |
| ... | ... | ... |
| AreaN-Block | HN, VN | region N, Block setting in horizontal & vertical directions |
| AreaN-H | PosNH-Start, PosNH-End | region N, horizontal coordinate interval |
| AreaV-Block | PosNV-Start, PosNV-End | region N, vertical coordinate interval |
| ... | ... | ... |

32 31

FIG. 3

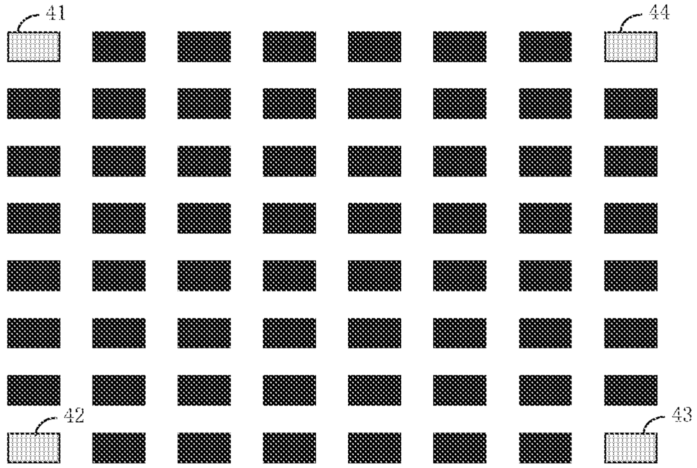

FIG. 4

COMPENSATION METHOD FOR DISPLAY AND DISPLAY

RELATED APPLICATIONS

This application is a National Phase of PCT Patent Application No. PCT/CN2021/136735 having International filing date of Dec. 9, 2021, which claims the benefit of priority of China Patent Application No. 202111442423.5 filed on Nov. 30, 2021. The contents of the above applications are all incorporated by reference as if fully set forth herein in their entirety.

FIELD AND BACKGROUND OF THE INVENTION

The present application relates to a display technology field, in particular to a compensation method for a display and a display.

In the current liquid crystal display field, a display non-uniformity phenomenon (i.e., mura) often occurs in a display. Accordingly, in the related art, a Demura apparatus is used to compensate the display data with a plurality of compensation units so as to eliminate the mura phenomenon of the liquid crystal display.

However, in the related art, the range of the minimum compensation unit is limited. For example, a compensation unit commonly used in 4K screens is 8×8 pixels, that is, 8×8 pixels are compensated as one compensation unit. However, for small mura smaller than the minimum compensation unit, such as VFS, Lens Mura, black and white dots, etc., the Demura apparatus in the related art cannot be used to repair them. Therefore, how to repair the local small mura is an urgent problem to be solved.

SUMMARY OF THE INVENTION

Technical Problem

The present application is mainly directed to a technical problem in the related art in which a local small mura cannot be repaired.

Technical Solution

In view of the above, the present application provides a compensation method for a display and a display, which can solve a problem that a single compensation region cannot repair non-uniform display in a local fine part of a display image, realize fine compensation for different display regions, further improve a compensation effect, and improve a phenomenon of non-uniform display.

According to an aspect of the present application, there is provided a compensation method for a display, the compensation method for the display comprises: acquiring a display image of the display; determining to-be-compensated regions corresponding to the display image, wherein the to-be-compensated regions comprise at least one first to-be-compensated region and at least one second to-be-compensated region; and compensating the display image based on the to-be-compensated regions, wherein a compensation mode of the at least one first to-be-compensated region is different from a compensation mode of the at least one second to-be-compensated region.

Further, determining the to-be-compensated regions corresponding to the display image comprises: determining the at least one first to-be-compensated region of the display image; and determining the at least one second to-be-compensated region of the display image.

Further, determining the at least one first to-be-compensated region of the display image comprises: acquiring a first to-be-compensated parameter and a second to-be-compensated parameter of each of the first to-be-compensated regions; determining a length of the first to-be-compensated region in a horizontal direction according to the first to-be-compensated parameter of each of the first to-be-compensated regions; and determining a length of the first to-be-compensated region in a vertical direction according to the second to-be-compensated parameter of each of the first to-be-compensated regions.

Further, each of the first to-be-compensated regions comprises at least one first to-be-compensated sub-region, wherein determining the at least one first to-be-compensated region of the display image further comprises: determining at least one first to-be-compensated sub-region of each of the first to-be-compensated regions.

Further, determining the at least one first to-be-compensated sub-region of each of the first to-be-compensated regions comprises: acquiring a third to-be-compensated parameter and a fourth to-be-compensated parameter of each of the first to-be-compensated sub-regions; determining a length of the first to-be-compensated sub-region in a horizontal direction according to the third to-be-compensated parameter of each of the first to-be-compensated sub-regions; and determining a length of the first to-be-compensated sub-region in a vertical direction according to the fourth to-be-compensated parameter of each of the first to-be-compensated sub-regions.

Further, compensating the display image based on the to-be-compensated regions, wherein the compensation mode of the at least one first to-be-compensated region is different from the compensation mode of the at least one second to-be-compensated region, comprises: determining whether a range of the to-be-compensated region exceeds a preset compensation threshold range; compensating the display image using the first to-be-compensated region when the range of the to-be-compensated region does not exceed the preset compensation threshold range; and compensating the display image using the second to-be-compensated region when the range of the to-be-compensated region exceeds the preset compensation threshold range.

Further, the first to-be-compensated sub-region comprises a first region and a second region, each of the regions comprises at least one pixel unit, and wherein compensating the display image using the first to-be-compensated region comprises: determining a compensation value corresponding to a pixel unit in the first region; determining a compensation value corresponding to a pixel unit in the second region according to the compensation value corresponding to the pixel unit in the first region; and compensating the display image according to the compensation value corresponding to the pixel unit in the first region and the compensation value corresponding to the pixel unit in the second region.

Further, determining the compensation value corresponding to the pixel unit in the second region according to the compensation value corresponding to the pixel unit in the first region comprises: estimating the compensation value corresponding to the pixel unit in the second region according to the compensation value corresponding to the pixel unit in the first region by interpolation, to obtain an estimated value corresponding to the pixel unit in the second region; and using the estimated value corresponding to the pixel unit in the second region as the compensation value corresponding to the pixel unit in the second region.

Further, the second to-be-compensated region comprises a third region and a fourth region, and compensating the display image using the second to-be-compensated region comprises: determining a compensation value corresponding to a pixel unit in the third region; determining a compensation value corresponding to a pixel unit in the fourth region according to the compensation value corresponding to the pixel unit in the third region; and compensating the display image based on the compensation value corresponding to the pixel unit in the third region and the compensation value corresponding to the pixel unit in the fourth region.

Further, determining the compensation value corresponding to the pixel unit in the fourth region according to the compensation value corresponding to the pixel unit in the third region comprises: estimating the compensation value corresponding to the pixel unit in the fourth region according to the compensation value corresponding to the pixel unit in the third region by linear interpolation, to obtain an estimated value corresponding to the pixel unit in the fourth region; and using the estimated value corresponding to the pixel unit in the fourth region as the compensation value corresponding to the pixel unit in the fourth region.

According to another aspect of the present application, there is provided a display comprising: an acquisition module electrically connected to an identification module, and configured to acquire a display image of the display; the identification module electrically connected to the acquisition module and a compensation module, and configured to determine to-be-compensated regions corresponding to the display image, wherein the to-be-compensated regions comprise at least one first to-be-compensated region and at least one second to-be-compensated region; the compensation module electrically connected to the identification module, and configured to compensate the display image based on the to-be-compensated regions, wherein a compensation mode of the at least one first to-be-compensated region is different from a compensation mode of the at least one second to-be-compensated region.

Further, the identification module comprises: a first identification module configured to determine the at least one first to-be-compensated region of the displayed image; a second identification module configured to determine the at least one second to-be-compensated region of the display image.

Further, the first identification module comprises: a first acquisition module configured to acquire a first to-be-compensated parameter and a second to-be-compensated parameter of each of the first to-be-compensated regions; a first to-be-compensated parameter setting module configured to determine a length of the first to-be-compensated region in a horizontal direction according to the first to-be-compensated parameter of each of the first to-be-compensated regions; a second to-be-compensated parameter setting module configured to determine a length of the first to-be-compensated region in a vertical direction according to the second to-be-compensated parameter of each of the first to-be-compensated regions.

Further, each of the first to-be-compensated regions comprises at least one first to-be-compensated sub-region, wherein the first identification module comprises: a first to-be-compensated sub-region determining module configured to determine the at least one first to-be-compensated sub-region of each of the first to-be-compensated regions.

Further, the first to-be-compensated sub-region determining module comprises: a second acquisition module configured to acquire a third to-be-compensated parameter and a fourth to-be-compensated parameter of each of the first to-be-compensated sub-regions; a third to-be-compensated parameter setting module configured to determine a length of the first to-be-compensated sub-region in a horizontal direction according to the third to-be-compensated parameter of each of the first to-be-compensated sub-regions; a fourth to-be-compensated parameter setting module configured to determine a length of the first to-be-compensated sub-region in a vertical direction according to the fourth to-be-compensated parameter of each of the first to-be-compensated sub-regions.

Further, the compensation module comprises: a determining module configured to determine whether a range of the to-be-compensated region exceeds a preset compensation threshold range; a first compensation module configured to compensate the display image using the first to-be-compensated region when the range of the to-be-compensated region does not exceed the preset compensation threshold range; a second compensation module configured to compensate the display image using the second to-be-compensated region when the range of the to-be-compensated region exceeds the preset compensation threshold range.

Further, the first to-be-compensated sub-region comprises a first region and a second region, each of the regions comprises at least one pixel unit, wherein the first compensation module comprises: a first region compensation determining module configured to determine a compensation value corresponding to a pixel unit in the first region; a second region compensation determining module configured to determine a compensation value corresponding to a pixel unit in the second region according to the compensation value corresponding to the pixel unit in the first region; a first compensation sub-module, configured to compensate the display image according to the compensation value corresponding to the pixel unit in the first region and the compensation value corresponding to the pixel unit in the second region.

Further, the second region compensation determining module comprises: a first estimation module, configured to estimate, by interpolation, the compensation value corresponding to the pixel unit in the second region according to the compensation value corresponding to the pixel unit in the first region, to obtain an estimated value corresponding to the pixel unit in the second region; and a first estimation determining module, configured to use the estimated value corresponding to the pixel unit in the second region as the compensation value corresponding to the pixel unit in the second region.

Further, the second to-be-compensated region comprises a third region and a fourth region, and the second compensation module comprises: a third region compensation determining module configured to determine a compensation value corresponding to a pixel unit in the third region; a fourth region compensation determining module, configured to determine a compensation value corresponding to a pixel unit in the fourth region according to the compensation value corresponding to the pixel unit in the third region; a second compensation sub-module configured to compensate the display image according to the compensation value corresponding to the pixel unit in the third region and the compensation value corresponding to the pixel unit in the fourth region.

Further, the fourth region compensation determining module comprises: a second estimation module, configured to estimate the compensation value corresponding to the pixel unit in the fourth region according to the compensation value corresponding to the pixel unit in the third region by linear interpolation, to obtain an estimated value corresponding to the pixel unit in the fourth region; a second estimation determining module, configured to use the estimated value corresponding to the pixel unit in the fourth region as the compensation value corresponding to the pixel unit in the fourth region.

Advantageous Effects

By dividing to-be-compensated regions corresponding to a display image into different to-be-compensated regions, and compensating the display image using different compensation modes in different to-be-compensated regions respectively, it is possible to solve the problem that a single compensation region cannot repair non-uniform display in a local fine part of a display image, realize fine compensation for the different display regions, further improve the compensation effect, and improve a phenomenon of display non-uniformity.

BRIEF DESCRIPTION OF THE SEVERAL VIEWS OF THE DRAWINGS

The technical solutions and other beneficial effects of the present application will be apparent from the detailed description of the specific embodiments of the present application with reference to the accompanying drawings.

FIG. 3 shows a schematic diagram of to-be-compensated parameters according to an embodiment of the present application.

FIG. 4 shows a schematic diagram of a first to-be-compensated sub-region according to an embodiment of the present application.

DESCRIPTION OF SPECIFIC EMBODIMENTS OF THE INVENTION

Figure 1:
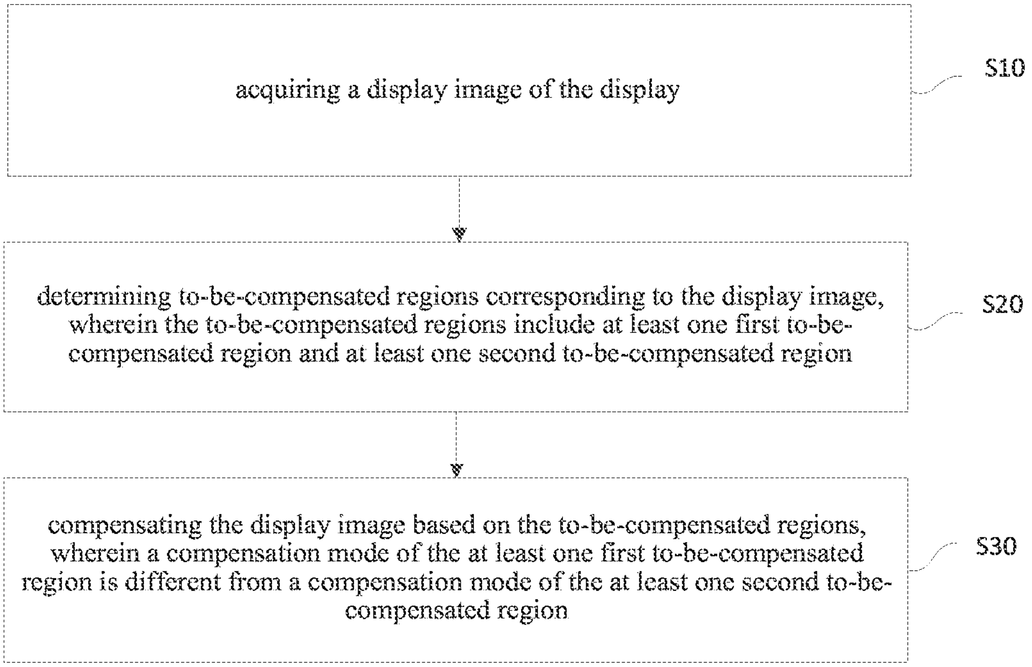
FIG. 1 shows a flowchart of a compensation method for a display according to an embodiment of the present application.

Technical solutions in embodiments of the present application will be clearly and completely described below in conjunction with drawings in the embodiments of the present application. Obviously, the described embodiments are only a part of embodiments of the present application, rather than all the embodiments. Based on the embodiments in the present application, all other embodiments obtained by those skilled in the art without creative work fall within the protection scope of the present application.

In the description of the present disclosure, it should be understood that orientations or position relationships indicated by the terms “center”, “longitudinal”, “lateral”, “length”, “width”, “thickness”, “upper”, “lower”, “front”, “rear”, “left”, “right”, “vertical”, “horizontal”, “top”, “bottom”, “inside”, “outside”, “clockwise”, and “counter-clockwise” are based on orientations or position relationships illustrated in the drawings. The terms are used to facilitate and simplify the description of the present disclosure, rather than indicate or imply that the devices or elements referred to herein are required to have specific orientations or be constructed or operate in the specific orientations. Accordingly, the terms should not be construed as limiting the present disclosure. In addition, the term “first”, “second” are for illustrative purposes only and are not to be construed as indicating or imposing a relative importance or implicitly indicating the number of technical features indicated. Thus, a feature that limited by “first”, “second” may expressly or implicitly include one or more of the features. In the description of the present disclosure, the meaning of “plural” is two or more, unless otherwise specifically defined.

In the description of the present disclosure, it should be noted that the terms “installation”, “connection” and “coupling” should be understood in a broad sense, unless otherwise clearly specified and defined. For example, it can be a fixed connection, a detachable connection, or integrated connection; it can be a mechanical connection, an electrical connection or can communicate with each other; it can be directly connected or indirectly connected through an intermediary, it can also be the connection between two elements or the interaction between two elements. Those ordinary skilled in the art can understand the specific meanings of the above terms in the present disclosure according to specific situations.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, applications of other processes and/or other materials may be appreciated those skilled in the art. In some examples, methods, means, elements, and circuits well known to those skilled in the art are not described in detail in order to highlight the subject matter of the present application.

The present application mainly provides a compensation method for a display, the compensation method for the display comprises: acquiring a display image of the display; determining to-be-compensated regions corresponding to the display image, wherein the to-be-compensated regions comprise at least one first to-be-compensated region and at least one second region to-be-compensated; compensating the display image based on the to-be-compensated regions.

By dividing the to-be-compensated regions corresponding to the display image into different to-be-compensated regions, and compensating the display image using different compensation methods in different to-be-compensated regions, the present application can solve the problem that a single compensation region cannot repair non-uniform display in a local fine part of the display image, realize fine compensation for different display regions, further improve the compensation effect, and improve the phenomenon of display non-uniformity.

FIG. 1 shows a flowchart of a compensation method for a display according to an embodiment of the present application.

As shown in FIG. 1, the compensation method for the display according to an embodiment of the present application includes:

Step S10: acquiring a display image of the display;

Wherein the display image of the display may be various images inputted to the display for display. For example, the display image of the display may be a fully white image (or all-white image), a fully black image (or all-black image), and a color image based on three primary colors of red, green, and blue.

Further, the display according to an embodiment of the present application may include a liquid crystal display panel (i.e., Liquid Crystal Display, LCD). Of course, the display according to an embodiment of the present application may also include a display panel based on OLED (i.e., Organic Light-Emitting Diode) or other types of display panels. It will be understood that the present application is not limited to the type of display.

Hereinafter, the present application will be described using a liquid crystal display panel as an example. Taking a liquid crystal display panel as an example, the display according to an embodiment of the present application may include a pixel unit array arranged in a plurality of rows and columns, a plurality of scan lines, and a plurality of data lines. Thin film transistors may be provided in each pixel unit, and each of the scan lines may be used to control turn-on and turn-off of the thin film transistors in one row of pixel units corresponding to the scan line; each of the data lines may be electrically connected to one pixel unit for writing display data into a corresponding pixel unit when the thin film transistor in the corresponding pixel unit is turned on, so as to drive the corresponding pixel unit to light up, thereby forming a display image of the display.

Exemplarily, the compensation method for the display according to an embodiment of the present application may be to compensate the grayscale of each pixel unit. Wherein the grayscale may represent different luminance levels between the darkest and brightest for each color. The eight-bit grayscale is taken as an example, and the grayscale ranges from 0 to 255 and has 256 levels in total. The grayscale data may be preset in the display data. It should be explained that the display image may include various parameters such as brightness, luminance, and the like, in addition to grayscale, and other parameters of the display image may be compensated by the compensation method for the display. It will be understood that the present application does not limit the parameters or objects compensated by the compensation method for the display.

Step S20: determining to-be-compensated regions corresponding to the display image, wherein the to-be-compensated regions include at least one first to-be-compensated region and at least one second to-be-compensated region;

Wherein each of the at least one first to-be-compensated region may have a size smaller than that of each of the at least one second region to-be-compensated. For example, the first to-be-compensated region may include 4×4 pixel units, and the second to-be-compensated region may include 16×16 pixel units.

Figure 2:
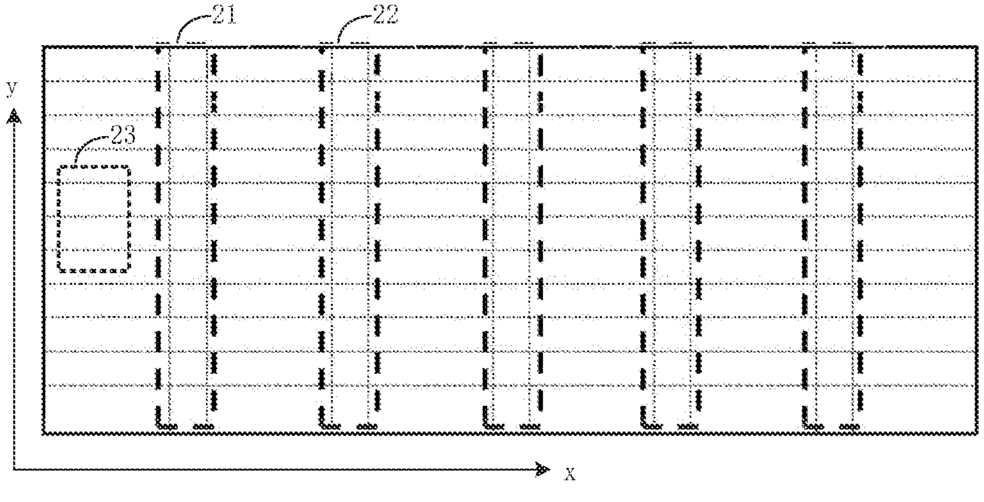
FIG. 2 shows a schematic diagram of a to-be-compensated region according to an embodiment of the present application.

FIG. 2 shows a schematic diagram of a to-be-compensated region according to an embodiment of the present application.

As shown in FIG. 2, a first to-be-compensated region 21, a first to-be-compensated region 22, and a second to-be-compensated region 23 corresponding to the display image may be determined. Each of the to-be-compensated regions may have a rectangular shape. For example, the size of the first to-be-compensated region 21 may be determined based on a length in x direction (i.e., a horizontal direction) and a length in y direction (i.e., a vertical direction or a perpendicular direction). The first to-be-compensated region 21 and the first to-be-compensated region 22 may be disposed adjacent to each other or at intervals.

Of course, the shapes of the respective to-be-compensated regions in the embodiments of the present application may be other shapes, for example a regular shape such as a circular shape or an elliptical shape, or an irregular shape such as a zigzag shape. It will be understood that the present application does not limit the specific shape of each to-be-compensated region.

Further, the determining a to-be-compensated region corresponding to the display image includes:

Step S21: determining at least one first to-be-compensated region of the display image;

Step S22: determining at least one second to-be-compensated region of the display image.

It should be noted that the step S21 and the step S22 may be performed simultaneously or sequentially. For example, at least one second to-be-compensated region of the display image may be determined first, and then at least one first to-be-compensated region of the display image may be determined. It will be understood that the present application does not limit the order of determining the first to-be-compensated region and the second to-be-compensated region.

Further, determining at least one first to-be-compensated region of the display image comprises:

Step S211: obtaining a first to-be-compensated parameter and a second to-be-compensated parameter of each of the first to-be-compensated regions;

Step S212: determining a length of the first to-be-compensated region in a horizontal direction according to the first to-be-compensated parameter of each of the first to-be-compensated regions;

Step S213: determining a length of the first to-be-compensated region in a vertical direction according to the second to-be-compensated parameter of each of the first to-be-compensated regions.

Wherein the first to-be-compensated parameter may be the length of the first to-be-compensated region in the horizontal direction corresponding to the first to-be-compensated parameter, and the second to-be-compensated parameter may be the length of a first to-be-compensated region in the vertical direction corresponding to the second to-be-compensated parameter. The first to-be-compensated parameter and the second to-be-compensated parameter of each of the first to-be-compensated regions may be stored in advance in the display.

It should be explained that the step S212 and the step S213 may be performed simultaneously or sequentially. The order of determining the first to-be-compensated parameter and the second to-be-compensated parameter is not limited in the present application.

FIG. 3 shows a schematic diagram of to-be-compensated parameters according to an embodiment of the present application.

As shown in FIG. 3, 31 may include the plurality of first to-be-compensated regions, Area1-Block, Area2-Block, Area3-Block, . . . , AreaN-Block may represent the 1st to N-th first to-be-compensated regions, respectively; 32 may represent the second to-be-compensated regions. Wherein N may be any natural number.

Exemplarily, for the first first to-be-compensated region Area1-Block, Area1-H may represent a first to-be-compensated parameter of the first first to-be-compensated region, and a horizontal coordinate interval (i.e., the first to-be-compensated parameter) is determined by a start coordinate point Pos1H-Start and an end coordinate point Pos1H-End in the horizontal direction; the Area1-V may represent a second to-be-compensated parameter of the first first to-be-compensated region, and a vertical coordinate interval (i.e., the second to-be-compensated parameter) is determined by a start coordinate point Pos1V-Start and an end coordinate point Pos1V-End in the vertical direction. Similarly, for the second first to-be-compensated region to the Nth first to-be-compensated region, the similar setting may be provided, and it will not be described repeatedly.

Further, each of the first to-be-compensated regions includes at least one first to-be-compensated sub-region, wherein determining at least one first to-be-compensated region of the display image further includes:

Step S214: determining at least one first to-be-compensated sub-region of each of the first to-be-compensated regions.

For example, in FIG. 3, the Areal-Block may include 16 first to-be-compensated sub-regions, which may be arranged in rows and columns. For example, the 16 first to-be-compensated sub-regions may be arranged in a manner of 4×4 or 8×2. Taking an embodiment in which the 16 first to-be-compensated sub-regions are arranged in the manner of 8×2 as an example, in this case, in FIG. 3, H1 may be 8, and V1 may be 2, that is, H1 may represent the number of first to-be-compensated sub-regions in the first to-be-compensated region in the horizontal direction; V1 may represent the number of first to-be-compensated sub-regions in the first to-be-compensated region in the vertical direction. By analogy, HN may represent the number of first to-be-compensated sub-regions in the N-th first to-be-compensated region in the horizontal direction; VN may represent the number of first to-be-compensated sub-regions in the N-th first to-be-compensated-region in the vertical direction.

Further, determining at least one first to-be-compensated sub-region of each of the first to-be-compensated regions includes:

Step S2141: obtaining a third to-be-compensated parameter and a fourth to-be-compensated parameter of each of the first to-be-compensated sub-regions;

Step S2142: determining a length of each of the first to-be-compensated sub-regions in the horizontal direction according to the third to-be-compensated parameter of each of the first to-be-compensated sub-regions;

Step S2143: determining a length of each of the first to-be-compensated sub-regions in the vertical direction according to the fourth to-be-compensated parameter of each of the first to-be-compensated sub-regions.

Exemplarily, the third to-be-compensated parameter of each of the first to-be-compensated sub-regions may be the number of pixel units in a corresponding first to-be-compensated sub-region in a horizontal direction; the fourth to-be-compensated parameter of each of the first to-be-compensated sub-regions may be the number of pixel units in the corresponding first to-be-compensated sub-region in the vertical direction.

For example, the first to-be-compensated sub-region may include 4×4 pixel units as a basic compensation unit to compensate for 4×4 pixels in the corresponding display image. At this time, the third to-be-compensated parameter of the first to-be-compensated sub-region may be 4, which indicates that the length of the first to-be-compensated sub-region in the horizontal direction includes 4 pixel units; the fourth to-be-compensated parameter of the first to-be-compensated sub-region may also be 4, which indicates that the length of the first to-be-compensated sub-region in the vertical direction includes 4 pixel units.

Step S30: compensating the display image based on the to-be-compensated regions, wherein a compensation mode of the at least one first to-be-compensated region is different from a compensation mode of the at least one second to-be-compensated region.

Further, compensating the display image based on the to-be-compensated regions, wherein the compensation mode of the at least one first to-be-compensated region is different from the compensation mode of the at least one second to-be-compensated region, comprising:

Step S31: determining whether the range of the to-be-compensated region exceeds a preset compensation threshold range;

Step S32: compensating the display image using the first to-be-compensated region when the range of the to-be-compensated region does not exceed a preset compensation threshold range;

In step S33, compensating the display image using the second to-be-compensated region when the range of the to-be-compensated region exceeds a preset compensation threshold range.

For example, the preset compensation threshold range may be 8×8. That is, when the range of the determined to-be-compensated region exceeds 8×8, the to-be-compensated region may be a second to-be-compensated region, and the display image may be compensated using the second to-be-compensated region; and when the range of the determined to-be-compensated region does not exceed 8×8, the to-be-compensated region may be a first to-be-compensated region, and the display image may be compensated using the first to-be-compensated region. That is, in the embodiment of the present application, different compensation methods may be adopted for the to-be-compensated regions with different ranges, thereby solving the problem that a single compensation region cannot repair non-uniform display in a local fine part of the display image, realizing fine compensation for different display regions, further improving the compensation effect, and improving the phenomenon of display non-uniformity.

Further, the preset compensation threshold range may be dynamically adjusted according to different display images of the display. Since the phenomenon of display non-uniformity may be different for different display images, the compensation accuracy can be improved by dynamically adjusting the preset compensation threshold range and performing different compensation modes for different display images.

Further, the first to-be-compensated sub-region includes a first region and a second region, each of the regions includes at least one pixel unit respectively, wherein compensating the display image using the first to-be-compensated region includes:

Step S321: determining a compensation value corresponding to a pixel unit in the first region;

Step S322: determining a compensation value corresponding to a pixel unit in the second region according to the compensation value corresponding to the pixel unit in the first region;

Step S323: compensating the display image according to the compensation value corresponding to the pixel unit in the first region and the compensation value corresponding to the pixel unit in the second region.

FIG. 4 shows a schematic diagram of a first to-be-compensated sub-region according to an embodiment of the present application.

As shown in FIG. 4, the first to-be-compensated sub-region may include a first region and a second region, and include a total of 64 pixels (i.e., 8×8). Each pixel point corresponds to one pixel unit. Wherein the first region may include a pixel 41, a pixel 42, a pixel 43, and a pixel 44, and the second region may be a region other than the first region in the first to-be-compensated sub-region, that is, 60 black rectangular frames in FIG. 4, representing 60 pixels.

Figure 5:
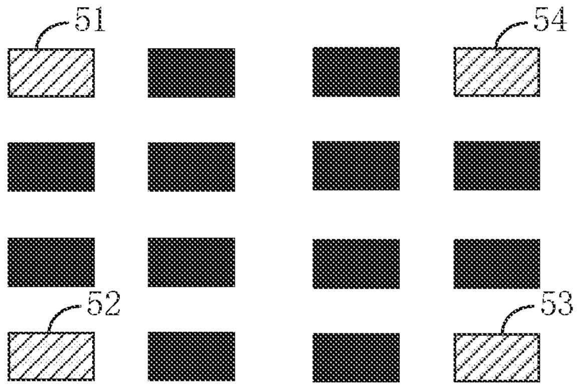
FIG. 5 shows a schematic diagram of a first to-be-compensated sub-region according to an embodiment of the present application.

FIG. 5 shows a schematic diagram of a first to-be-compensated sub-region according to an embodiment of the present application.

As shown in FIG. 5, the first to-be-compensated sub-region may include a first region and a second region, and include a total of 16 pixels (i.e., 4×4). Each pixel point corresponds to one pixel unit. Wherein the first region may include a pixel 51, a pixel 52, a pixel 53, and a pixel 54, and the second region may be a region other than the first region in the first to-be-compensated sub-region, i.e., 12 black rectangular frames in FIG. 5, representing 12 pixels.

Further, the determining the compensation value corresponding to the pixel unit in the second region according to the compensation value corresponding to the pixel unit in the first region comprises:

Step S3231: estimating, by interpolation, the compensation value corresponding to the pixel unit in the second region according to the compensation value corresponding to the pixel unit in the first region, to obtain an estimated value corresponding to the pixel unit in the second region;

Step S3232: using the estimated value corresponding to the pixel unit in the second region as the compensation value corresponding to the pixel unit in the second region.

Specifically, taking FIG. 5 as an example, the compensation values corresponding to the four pixels in the first region may be acquired first, the compensation values corresponding to the pixel units in the second region may be estimated by interpolation according to the compensation values corresponding to the four pixels at the edge positions, and the estimated values corresponding to the pixel units in the second region may be obtained, and finally the estimated values corresponding to the pixel units in the second region may be used as the compensation values corresponding to the pixel units in the second region. The compensation process shown in FIG. 4 is similar to that shown in FIG. 5, and is not described again.

Further, the second to-be-compensated region includes a third region and a fourth region, and compensating the display image using the second to-be-compensated region includes:

Step S331: determining a compensation value corresponding to a pixel unit in a third region;

Step S332: determining a compensation value corresponding to a pixel unit in a fourth region according to the compensation value corresponding to the pixel unit in the third region;

Step S333: compensating the display image according to the compensation value corresponding to the pixel unit in the third region and the compensation value corresponding to the pixel unit in the fourth region.

Specifically, the sizes of the third region and the fourth region in the second to-be-compensated region may be divided in any form. Since the second to-be-compensated region is greater than the first to-be-compensated region, the dividing of the third region and the fourth region may have more forms. For example, the third region may also be similar to the first region, that is, the third region includes pixels located at four corner positions of the second to-be-compensated region.

It should be noted that in step S332, the compensation value corresponding to the pixel unit in the fourth region can be determined from the compensation value corresponding to the pixel unit in the third region using linear interpolation. That is, in an embodiment of the present application, for example, the first to-be-compensated region may be compensated by interpolation, and the second to-be-compensated region may be compensated by linear interpolation. Since the compensation mode for compensating the first to-be-compensated region may be different from the compensation mode for compensating the second to-be-compensated region, it is possible to solve the problem that a single compensation region cannot repair non-uniform display in a local fine part of the display image, realize fine compensation for different display regions, further improve the compensation effect, and improve the phenomenon of display non-uniformity. It will be understood that, in addition to compensation using interpolation and linear interpolation, other compensation modes may be provided in the embodiments of the present application, and the compensation modes for the first to-be-compensated region and the second to-be-compensated region are not limited in the present application.

In addition, the present application further provides a display, the display comprises: an acquisition module electrically connected to an identification module, the acquisition module is configured to acquire a display image of the display; the identification module electrically connected to the acquisition module and a compensation module, the identification module is configured to determine a to-be-compensated region corresponding to the display image, wherein the to-be-compensated region includes at least one first to-be-compensated region and at least one second to-be-compensated region; the compensation module electrically connected to the identification module, the compensation module is configured to compensate the display image based on the to-be-compensated region, wherein a compensation mode of the at least one first to-be-compensated region is different from a compensation mode of the at least one second to-be-compensated region.

Further, the identification module includes: a first identification module for determining at least one first to-be-compensated region of the display image; a second identification module for determining at least one second to-be-compensated region of the display image.

Further, the first identification module includes a first acquisition module, configured to acquire a first to-be-compensated parameter and a second to-be-compensated parameter of each of the first to-be-compensated regions; a first to-be-compensated parameter setting module for determining a length of each of first to-be-compensated regions in a horizontal direction according to the first to-be-compensated parameter of each of the first to-be-compensated regions; a second to-be-compensated parameter setting module for determining a length of each of the first to-be-compensated regions in a vertical direction according to the second to-be-compensated parameter of each of the first to-be-compensated regions.

Further, each of the first to-be-compensated regions includes at least one first to-be-compensated sub-region, wherein the first identification module further includes a first to-be-compensated sub-region determining module for determining at least one first to-be-compensated sub-region of each of the first to-be-compensated regions.

Further, the first to-be-compensated sub-region determining module is specifically configured to acquire a third to-be-compensated parameter and a fourth to-be-compensated parameter of each of the first to-be-compensated sub-regions; determining a length of the first to-be-compensated sub-region in a horizontal direction according to the third to-be-compensated parameter of each of the first to-be-compensated sub-regions; determining a length of the first to-be-compensated sub-region in a vertical direction according to the fourth to-be-compensated parameter of each of the first to-be-compensated sub-regions.

Further, the compensation module includes: a determining module for determining whether a range of the to-be-compensated region exceeds a preset compensation threshold range; a first compensation module for compensating the display image using the first to-be-compensated region when the range of the to-be-compensated region does not exceed the preset compensation threshold range; a second compensation module for compensating the display image using the second to-be-compensated region when the range of the to-be-compensated region exceeds the preset compensation threshold range.

Further, the first to-be-compensated sub-region includes a first region and a second region, each of the regions includes at least one pixel unit, and the first compensation module includes: a first region compensation determining module, configured to determine a compensation value corresponding to a pixel unit in the first region; a second region compensation determining module, configured to determine a compensation value corresponding to the pixel unit in the second region according to the compensation value corresponding to the pixel unit in the first region; a first compensation sub-module, configured to compensate the display image according to the compensation value corresponding to the pixel unit in the first region and the compensation value corresponding to the pixel unit in the second region.

Further, the second region compensation determining module includes: a first estimation module, configured to estimate, by interpolation, the compensation value corresponding to the pixel unit in the second region according to the compensation value corresponding to the pixel unit in the first region, to obtain an estimated value corresponding to the pixel unit in the second region; a first estimation determining module, configured to use the estimated value corresponding to the pixel unit in the second region as the compensation value corresponding to the pixel unit in the second region.

Further, the second to-be-compensated region includes a third region and a fourth region, and the second compensation module includes: a third region compensation determining module, configured to determine a compensation value corresponding to a pixel unit in the third region; a fourth region compensation determining module, configured to determine the compensation value corresponding to the pixel unit in the fourth region according to the compensation value corresponding to the pixel unit in the third region; a second compensation sub-module configured to compensate the display image according to a compensation value corresponding to the pixel unit in the third region and a compensation value corresponding to the pixel unit in the fourth region.

It should be noted that the respective modules of the display are configured to perform the compensation method of the display of the embodiment of the present application. For the specific details of the modules of the display, please refer to the specific description of the compensation method for the display in the embodiments of the present application, and details are not described herein again.

In conclusion, according to the embodiment of the present application, the to-be-compensated region corresponding to the display image is divided into different to-be-compensated regions, and the display image is compensated in different to-be-compensated regions by different compensation methods, which can solve the problem that a single compensation region cannot be used to repair the non-uniform display in a local fine part of the display image, realize fine compensation for different display regions, further improve the compensation effect, and improve the phenomenon of display non-uniformity.

In the above-described embodiments, the description of each of the various embodiments has its own focus, and portions of some embodiments that are not described in detail may be referred to the related descriptions of other embodiments.

The compensation method and the display provided in the embodiments of the present application are described in detail above. Specific examples are used in this article to illustrate the principles and implementations of the present disclosure. The description of the embodiments is merely intended to help understand the technical solutions and core ideas of the present application. Those of ordinary skill in the art will appreciate that they may still modify the technical solutions described in the foregoing embodiments, or equivalently replace some of the technical features therein; These modifications or substitutions do not deviate the nature of the respective solutions from the scope of the solutions of the embodiments of the present application.

What is claimed is:

1. A compensation method for a display, wherein the compensation method for the display comprises following steps:

acquiring a display image of the display;

determining to-be-compensated regions corresponding to the display image, wherein the to-be-compensated regions comprise at least one first to-be-compensated region and at least one second to-be-compensated region; and compensating the display image based on the to-be-compensated regions, wherein a compensation mode of the at least one first to-be-compensated region is different from a compensation mode of the at least one second to-be-compensated region, wherein determining the to-be-compensated regions corresponding to the display image comprises following steps: determining the at least one first to-be-compensated region of the display image; and determining the at least one second to-be-compensated region of the display image, wherein each of the first to-be-compensated regions comprises at least one first to-be-compensated sub-region, wherein determining the at least one first to-be-compensated region of the display image further comprises a following step: determining the at least one first to-be-compensated sub-region of each of the first to-be-compensated regions, and wherein compensating the display image based on the to-be-compensated regions, wherein the compensation mode of the at least one first to-be-compensated region is different from the compensation mode of the at least one second to-be-compensated region, comprises following steps: determining whether a range of the to-be-compensated region exceeds a preset compensation threshold range; compensating the display image using the first to-be-compensated region when the range of the to-be-compensated region does not exceed the preset compensation threshold range; and compensating the display image using the second to-be-compensated region when the range of the to-be-compensated region exceeds the preset compensation threshold range.

2. The compensation method for the display according to claim 1, wherein determining the at least one first to-be-compensated region of the display image comprises following steps: acquiring a first to-be-compensated parameter and a second to-be-compensated parameter of each of the first to-be-compensated regions; determining a length of the first to-be-compensated region in a horizontal direction according to the first to-be-compensated parameter of each of the first to-be-compensated regions; and determining a length of the first to-be-compensated region in a vertical direction according to the second to-be-compensated parameter of each of the first to-be-compensated regions.

3. The compensation method for the display according to claim 1, wherein determining the at least one first to-be-compensated sub-region of each of the first to-be-compensated regions comprises following steps: acquiring a third to-be-compensated parameter and a fourth to-be-compensated parameter of each of the first to-be-compensated sub-regions; determining a length of the first to-be-compensated sub-region in a horizontal direction according to the third to-be-compensated parameter of each of the first to-be-compensated sub-regions; and determining a length of the first to-be-compensated sub-region in a vertical direction according to the fourth to-be-compensated parameter of each of the first to-be-compensated sub-regions.

4. The compensation method for the display according to claim 1, wherein the first to-be-compensated sub-region comprises a first region and a second region, each of the regions comprises at least one pixel unit, and wherein compensating the display image using the first to-be-compensated region comprises following steps: determining a compensation value corresponding to a pixel unit in the first region; determining a compensation value corresponding to a pixel unit in the second region according to the compensation value corresponding to the pixel unit in the first region; and compensating the display image according to the compensation value corresponding to the pixel unit in the first region and the compensation value corresponding to the pixel unit in the second region.

5. The compensation method for the display according to claim 4, wherein determining the compensation value corresponding to the pixel unit in the second region according to the compensation value corresponding to the pixel unit in the first region comprises following steps: estimating the compensation value corresponding to the pixel unit in the second region according to the compensation value corresponding to the pixel unit in the first region by interpolation, to obtain an estimated value corresponding to the pixel unit in the second region; and using the estimated value corresponding to the pixel unit in the second region as the compensation value corresponding to the pixel unit in the second region.

6. The compensation method for the display according to claim 1, wherein the second to-be-compensated region comprises a third region and a fourth region, and compensating the display image using the second to-be-compensated region comprises following steps: determining a compensation value corresponding to a pixel unit in the third region; determining a compensation value corresponding to a pixel unit in the fourth region according to the compensation value corresponding to the pixel unit in the third region; and compensating the display image based on the compensation value corresponding to the pixel unit in the third region and the compensation value corresponding to the pixel unit in the fourth region.

7. The compensation method for the display according to claim 6, wherein determining the compensation value corresponding to the pixel unit in the fourth region according to the compensation value corresponding to the pixel unit in the third region comprises following steps: estimating the compensation value corresponding to the pixel unit in the fourth region according to the compensation value corresponding to the pixel unit in the third region by linear interpolation, to obtain an estimated value corresponding to the pixel unit in the fourth region; and using the estimated value corresponding to the pixel unit in the fourth region as the compensation value corresponding to the pixel unit in the fourth region.

8. A display, wherein the display comprises: a processor, configured to cause the display to perform the following operations:

acquiring a display image of the display;

determining to-be-compensated regions corresponding to the display image, wherein the to-be-compensated regions comprise at least one first to-be-compensated region and at least one second to-be-compensated region; and compensating the display image based on the to-be-compensated regions, wherein a compensation mode of the at least one first to-be-compensated region is different from a compensation mode of the at least one second to-be-compensated region, wherein determining the to-be-compensated regions corresponding to the display image comprises following steps: determining the at least one first to-be-compensated region of the display image; and determining the at least one second to-be-compensated region of the display image, wherein each of the first to-be-compensated regions comprises at least one first to-be-compensated sub-region, wherein determining the at least one first to-be-compensated region of the display image further comprises a following step: determining the at least one first to-be-compensated sub-region of each of the first to-be-compensated regions, and wherein compensating the display image based on the to-be-compensated regions, wherein the compensation mode of the at least one first to-be-compensated region is different from the compensation mode of the at least one second to-be-compensated region, comprises following steps: determining whether a range of the to-be-compensated region exceeds a preset compensation threshold range; compensating the display image using the first to-be-compensated region when the range of the to-be-compensated region does not exceed the preset compensation threshold range; and compensating the display image using the second to-be-compensated region when the range of the to-be-compensated region exceeds the preset compensation threshold range.

9. The display according to claim 8, wherein determining the at least one first to-be-compensated region of the display image comprises following steps: acquiring a first to-be-compensated parameter and a second to-be-compensated parameter of each of the first to-be-compensated regions; determining a length of the first to-be-compensated region in a horizontal direction according to the first to-be-compensated parameter of each of the first to-be-compensated regions; and determining a length of the first to-be-compensated region in a vertical direction according to the second to-be-compensated parameter of each of the first to-be-compensated regions.

10. The display according to claim 8, wherein determining the at least one first to-be-compensated sub-region of each of the first to-be-compensated regions comprises following steps: acquiring a third to-be-compensated parameter and a fourth to-be-compensated parameter of each of the first to-be-compensated sub-regions; determining a length of the first to-be-compensated sub-region in a horizontal direction according to the third to-be-compensated parameter of each of the first to-be-compensated sub-regions; and determining a length of the first to-be-compensated sub-region in a vertical direction according to the fourth to-be-compensated parameter of each of the first to-be-compensated sub-regions.

11. The display according to claim 8, wherein the first to-be-compensated sub-region comprises a first region and a second region, each of the regions comprises at least one pixel unit, and wherein compensating the display image using the first to-be-compensated region comprises following steps: determining a compensation value corresponding to a pixel unit in the first region; determining a compensation value corresponding to a pixel unit in the second region according to the compensation value corresponding to the pixel unit in the first region; and compensating the display image according to the compensation value corresponding to the pixel unit in the first region and the compensation value corresponding to the pixel unit in the second region.

12. The display according to claim 11, wherein determining the compensation value corresponding to the pixel unit in the second region according to the compensation value corresponding to the pixel unit in the first region comprises following steps: estimating the compensation value corresponding to the pixel unit in the second region according to the compensation value corresponding to the pixel unit in the first region by interpolation, to obtain an estimated value corresponding to the pixel unit in the second region; and using the estimated value corresponding to the pixel unit in the second region as the compensation value corresponding to the pixel unit in the second region.

13. The display according to claim 8, wherein the second to-be-compensated region comprises a third region and a fourth region, and compensating the display image using the second to-be-compensated region comprises following steps: determining a compensation value corresponding to a pixel unit in the third region; determining a compensation value corresponding to a pixel unit in the fourth region according to the compensation value corresponding to the pixel unit in the third region; and compensating the display image based on the compensation value corresponding to the pixel unit in the third region and the compensation value corresponding to the pixel unit in the fourth region.

14. The display according to claim 13, wherein determining the compensation value corresponding to the pixel unit in the fourth region according to the compensation value corresponding to the pixel unit in the third region comprises following steps: estimating the compensation value corresponding to the pixel unit in the fourth region according to the compensation value corresponding to the pixel unit in the third region by linear interpolation, to obtain an estimated value corresponding to the pixel unit in the fourth region; and using the estimated value corresponding to the pixel unit in the fourth region as the compensation value corresponding to the pixel unit in the fourth region.

* * * * *